United States Patent
Aldrich, III et al.

(10) Patent No.: US 9,109,566 B2
(45) Date of Patent: Aug. 18, 2015

(54) METHOD OF SMOOTHING NON-DRIVER-COMMANDED RESTARTS OF A HYBRID VEHICLE

(76) Inventors: William L. Aldrich, III, Davisburg, MI (US); Goro Tamai, West Bloomfield, MI (US); Mark A. Zerbini, Canton, MI (US); Usman Khan, Farmington Hills, MI (US)

( * ) Notice: Subject to any disclaimer, the term of this patent is extended or adjusted under 35 U.S.C. 154(b) by 2378 days.

(21) Appl. No.: 11/954,945

(22) Filed: Dec. 12, 2007

(65) Prior Publication Data

US 2009/0024264 A1    Jan. 22, 2009

Related U.S. Application Data

(60) Provisional application No. 60/961,547, filed on Jul. 20, 2007.

(51) Int. Cl.
| | |
|---|---|
| B60L 9/00 | (2006.01) |
| F02N 11/08 | (2006.01) |
| B60K 6/365 | (2007.10) |
| B60K 6/48 | (2007.10) |
| B60K 6/547 | (2007.10) |
| B60W 10/115 | (2012.01) |

(Continued)

(52) U.S. Cl.
CPC ............ *F02N 11/0822* (2013.01); *B60K 6/365* (2013.01); *B60K 6/48* (2013.01); *B60K 6/547* (2013.01); *B60W 10/115* (2013.01); *B60W 10/30* (2013.01); *B60W 30/192* (2013.01); *F02N 11/084* (2013.01); *B60L 2240/441* (2013.01); *B60W 20/00* (2013.01); *B60W 2510/0638* (2013.01); *F02N 2300/2002* (2013.01); *F02N 2300/2011* (2013.01); *Y02T 10/48* (2013.01); *Y02T 10/6221* (2013.01)

(58) Field of Classification Search
CPC ..... B60W 10/06; B60W 20/00; B60W 10/02; B60W 10/115; B60W 2540/10; B60H 1/004; F02D 41/062
USPC ........... 701/22, 112, 36, 57, 58, 99, 100, 101, 701/102, 103; 903/902, 905; 477/5, 6
See application file for complete search history.

(56) References Cited

U.S. PATENT DOCUMENTS

| | | | | |
|---|---|---|---|---|
| 5,081,365 | A * | 1/1992 | Field et al. | 290/45 |
| 6,730,000 | B1 * | 5/2004 | Leising et al. | 477/110 |

(Continued)

FOREIGN PATENT DOCUMENTS

EP    1762452 A2    3/2007

*Primary Examiner* — Thomas G Black
*Assistant Examiner* — Sze-Hon Kong

(57) ABSTRACT

A hybrid engine control system comprises a hybrid engine control module and a torque mitigation module. The hybrid engine control module selectively stops an internal combustion engine (ICE). The hybrid engine control module selectively starts the ICE based upon driver inputs and non-driver inputs. The torque mitigation module reduces torque transfer from the ICE to a driveline while the ICE is started based upon the non-driver inputs and maintains torque transfer from the ICE to the driveline while the ICE is started based upon the driver inputs. A method comprises selectively stopping an internal combustion engine (ICE); selectively starting the ICE based upon driver inputs and non-driver inputs; reducing torque transfer from the ICE to a driveline while the ICE is started based upon the non-driver inputs; and maintaining torque transfer from the ICE to the driveline while the ICE is started based upon the driver inputs.

17 Claims, 6 Drawing Sheets

(51) Int. Cl.
B60W 10/30 (2006.01)
B60W 30/192 (2012.01)
B60W 20/00 (2006.01)

(56) References Cited

U.S. PATENT DOCUMENTS

| | | | |
|---|---|---|---|
| 7,578,364 B2* | 8/2009 | Ohno | 180/65.28 |
| 7,654,932 B2* | 2/2010 | Gohring et al. | 477/5 |
| 7,666,115 B2* | 2/2010 | Ito et al. | 477/5 |
| 7,770,678 B2* | 8/2010 | Nozaki et al. | 180/65.6 |
| 2003/0110875 A1* | 6/2003 | Brandt | 74/335 |
| 2004/0152558 A1* | 8/2004 | Takami et al. | 477/3 |
| 2004/0173174 A1* | 9/2004 | Sugino et al. | 123/179.28 |
| 2005/0211479 A1* | 9/2005 | Tamor | 180/65.2 |
| 2006/0225450 A1* | 10/2006 | Dage et al. | 62/323.1 |
| 2007/0068478 A1* | 3/2007 | Zillmer et al. | 123/192.1 |
| 2007/0102211 A1 | 5/2007 | Nozaki et al. | |
| 2007/0114082 A1* | 5/2007 | Nozaki et al. | 180/65.6 |
| 2007/0157899 A1* | 7/2007 | Seufert et al. | 123/179.25 |
| 2007/0204817 A1* | 9/2007 | Russell et al. | 123/90.12 |
| 2008/0064560 A1* | 3/2008 | Popp et al. | 477/5 |
| 2008/0224478 A1* | 9/2008 | Tamor | 290/40 C |

* cited by examiner

METHOD OF SMOOTHING NON-DRIVER-COMMANDED RESTARTS OF A HYBRID VEHICLE

CROSS-REFERENCE TO RELATED APPLICATIONS

This application claims the benefit of U.S. Provisional Application No. 60/961,547, filed on Jul. 20, 2007. The disclosure of the above application is incorporated herein by reference in its entirety.

FIELD

The present disclosure relates to hybrid vehicles, and more particularly to smoothing non-driver-commanded engine restarts in hybrid vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a hybrid powertrain of a vehicle is presented. An engine 102 provides torque to a transmission 104. The transmission 104 transmits torque to a driveline 106. The engine 102 also drives and is driven by a belt alternator starter (BAS) system 110. BAS systems may be characterized by a combination motor/generator used in place of a standard alternator and connected to the crankshaft of the engine 102 via the accessory drive belt.

The BAS 110 converts power from the engine 102 into electrical power, which may be stored in charge storage 112. When the engine 102 is not running, the BAS 110 may use power from the charge storage 112 to drive the crankshaft of the engine 102, and thereby propel the vehicle. The BAS 110 and the engine 102 are controlled by a hybrid engine control module (ECM) 120. The hybrid ECM 120 receives signals from driver inputs 122, such as an accelerator pedal, a gear shift lever, and/or a brake pedal.

When the vehicle comes to a stop, the hybrid ECM 120 may instruct the engine 102 to shut off. For example, this may be achieved by stopping fuel delivery and spark to the engine 102. When the driver desires to start the vehicle from the stop, as indicated by lifting their foot off the brake pedal or pressing the accelerator pedal, the hybrid ECM 120 may command the engine 102 to restart. Also, the engine 102 may be commanded to start by the ECM 120 for reasons not initiated by the driver. When the engine 102 restarts, torque from the engine 102 is transmitted through the transmission 104 to the driveline 106. If the brakes are applied during the engine 102 start, the driveline 106 is unable to rotate, and the torque is transmitted directly to the frame of the vehicle, which is experienced as a jerk disturbance by the driver.

SUMMARY

A hybrid engine control system comprises a hybrid engine control module and a torque mitigation module. The hybrid engine control module selectively stops an internal combustion engine (ICE). The hybrid engine control module selectively starts the ICE based upon driver inputs and non-driver inputs. The torque mitigation module reduces torque transfer from the ICE to a driveline while the ICE is started based upon the non-driver inputs and maintains torque transfer from the ICE to the driveline while the ICE is started based upon the driver inputs.

In other features, the torque mitigation module reduces torque transfer by commanding a reduced hydraulic pressure from a pump in a transmission. The reduced hydraulic pressure is a function of transmission oil temperature. The pump is powered by a charge storage module. The torque mitigation module reduces torque transfer by disengaging an electronically-controlled clutch in a transmission.

In further features, the torque mitigation module reduces torque transfer by selecting a higher gear in a transmission. The non-driver inputs include low state-of-charge of a charge storage module. The non-driver inputs include a demand signal from a heating, ventilation, and air-conditioning module. The driver inputs include signals from an accelerator pedal and a brake pedal.

A method comprises selectively stopping an internal combustion engine (ICE); selectively starting the ICE based upon driver inputs and non-driver inputs; reducing torque transfer from the ICE to a driveline while the ICE is started based upon the non-driver inputs; and maintaining torque transfer from the ICE to the driveline while the ICE is started based upon the driver inputs.

In other features, the reducing torque transfer includes commanding a reduced hydraulic pressure from a pump in a transmission. The reduced hydraulic pressure is a function of transmission oil temperature. The reducing torque transfer includes disengaging an electronically-controlled clutch in a transmission.

In further features, the reducing torque transfer includes selecting a higher gear in a transmission. The non-driver inputs include low state-of-charge of a charge storage module. The non-driver inputs include a demand signal from a heating, ventilation, and air-conditioning module. The driver inputs include signals from an accelerator pedal and a brake pedal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
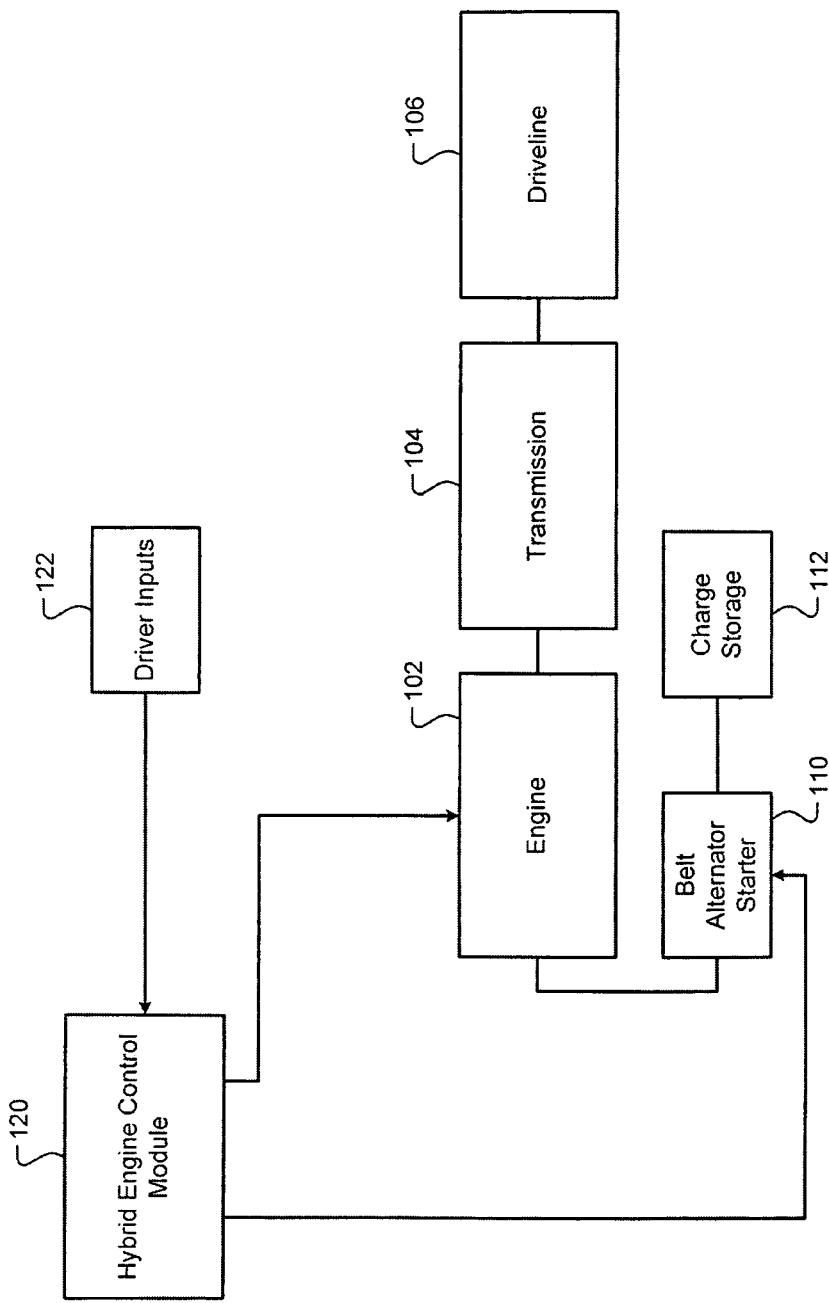
FIG. 1 is a functional block diagram of a hybrid powertrain of a vehicle according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2A:
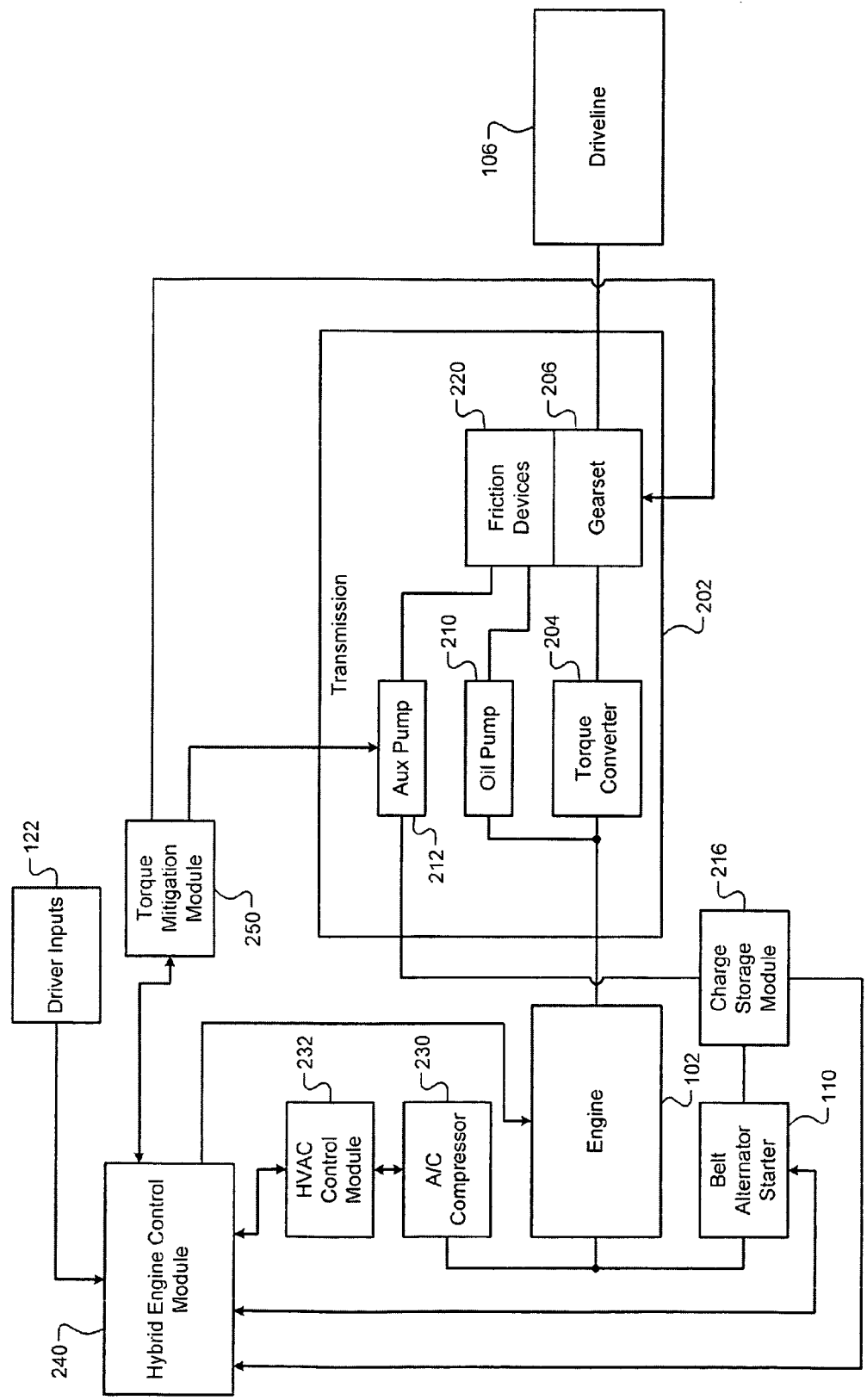
FIG. 2A is a functional block diagram of an exemplary hybrid powertrain according to the principles of the present disclosure.

Referring now to FIG. 2A, a functional block diagram of an exemplary hybrid powertrain is presented. The engine 102 transfers torque to a transmission 202, which transfers torque to the driveline 106. The transmission 202 may include a torque converter 204, which receives torque from the engine 102 and couples the torque to a gearset 206.

The gearset 206 transfers torque to the driveline 106. The transmission 202 includes an oil pump 210, which may be driven by the input to the torque converter 204. The transmission 202 also includes an auxiliary pump 212, which may be powered by a charge storage module 216. The auxiliary pump 212 and the oil pump 210 provide hydraulic power to friction devices 220 of the transmission 202.

For example only, the friction devices 220 may include clutches and/or bands. The friction devices 220 control which gear ratio is selected in the gearset 206. For example only, the gearset 206 may be a planetary gearset. The friction devices 220 may control which components of the gearset 206 are locked to each other, to a housing of the gearset 206, and/or to the input or the output of the gearset 206. This controls the gear ratio of the gearset 206.

The belt alternator starter (BAS) 110 converts power from the engine 102 into electrical power, which may be stored in the charge storage module 216. The BAS 110 may also drive the crankshaft of the engine 102 in order to propel the vehicle when the engine 102 is not running. The BAS 110 and the engine 102 may be coupled via a front end accessory drive (FEAD) belt.

The FEAD belt may also drive an air-conditioning (A/C) compressor 230. A heating ventilation and air-conditioning (HVAC) control module 232 controls the A/C compressor 230. The HVAC control module 232 may control a blower motor for blowing conditioned air into the passenger compartment of the vehicle and may measure a temperature of the engine 102 and/or engine coolant. The HVAC control module 232 may use the A/C compressor 230 to provide cooled and/or dehumidified air and may use heat from the engine 102 to provide heated air.

A hybrid engine control module (ECM) 240 controls the engine 102 and the BAS 110. When the vehicle comes to a stop, the hybrid ECM 240 may instruct the engine 102 to shut off, such as by stopping provision of fuel and spark to the engine 102. When the driver wishes to start the vehicle from the stop, as indicated by the driver inputs 122, the hybrid ECM 240 may instruct the engine 102 to restart. This is termed a driver-commanded engine restart.

The auxiliary pump 212 is used to pump oil to provide hydraulic pressure to the transmission 202 when the engine 102 is not running. When vehicle conditions allow, such as zero vehicle speed, brake applied and zero accelerator pedal position, the hybrid ECM 240 may instruct the engine 102 to shut off. The hybrid ECM 240 may instruct the engine 102 to shut off to improve fuel economy. When the speed of the engine 102 falls below a threshold, the hybrid ECM 240 may instruct the auxiliary pump 212 to turn on and produce a predetermined boosted pressure.

The boosted auxiliary pump pressure minimizes pressure dips during the transition between pressure being provided by the mechanically-driven oil pump 210 and being provided by the electrically-powered auxiliary pump 212. After shut-off of the engine 102 has begun, the auxiliary pump 212 is directed to produce a steady-state pressure that is less than the boosted pressure. This transition may occur once the engine 102 has stopped rotating. Once the engine 102 is restarted and reaches a certain RPM, pressure from the auxiliary pump 212 may be reduced to zero and the auxiliary pump 212 may be turned off.

While the engine 102 is shut off, the hybrid ECM 240 may measure state of charge of the charge storage module 216. If the state of charge of the charge storage module 216 decreases below a threshold level, the hybrid ECM 240 may instruct the engine 102 to restart. This is an example of a non-driver-commanded engine restart.

Another possible example of a non-driver-commanded engine restart is when the HVAC control module 232 requests that the engine 102 restart. For example, the HVAC control module 232 may require that more heat be generated in the engine 102 to provide heated air. The HVAC control module 232 may require that the A/C compressor 230 be powered to provide chilled and/or dehumidified air.

When the engine 102 restarts, torque transmitted through the transmission 202 to the driveline 106 may be absorbed by the frame of the vehicle because the wheels of the driveline 106 are not turning. This may be experienced by the driver as a jerk or a bump. This jerk may be expected by the driver during a driver-commanded engine restart. However, a non-driver-commanded engine restart may be surprising to the driver, and may be experienced as a quality issue.

To mitigate the feeling of jerk, the hybrid ECM 240 may instruct a torque mitigation module 250 to reduce the amount of torque coupled to the driveline 106 by the transmission 202. In order to reduce torque transfer by the transmission 202, the torque mitigation module 250 may temporarily allow the friction devices 220 to slip and/or instruct the gearset 206 to temporarily select a lower gear ratio.

The torque mitigation module 250 may instruct the auxiliary pump 212 to reduce hydraulic line pressure while the engine is restarted in response to a non-driver-commanded restart. With lower line pressure, the friction devices 220 will not be fully engaged and will allow slippage of components of the gearset 206. The lower line pressure selected may be a function of transmission oil temperature. For example, the friction devices 220 may include a multi-plate wet clutch, whose capacity is affected by oil viscosity, which is a function of temperature. The lower line pressure may also prevent a hydraulic piston from fully engaging a band.

Once the engine has restarted, pressure from the oil pump 210 takes over and the auxiliary pump 212 can be powered down. Once slack in the driveline 106 is taken up by the gradual torque transfer produced by the torque mitigation module 250, the friction devices 220 can be operated at full pressure and the gearset 206 can be returned to the desired gear.

The torque mitigation module 250 may also temporarily instruct the gearset 206 to select a lower gear ratio in order to reduce torque transfer by the transmission 202. For example, instead of a first gear speed reduction from 3.06 to 1, an overdrive ratio of 0.70 to 1 may be selected. By lowering the gear ratio, the torque mitigation module 250 reduces the torque transferred to the driveline 106. Once the engine 102 has restarted, the gearset can return to the first gear ratio of 3.06:1.

Figure 2B:
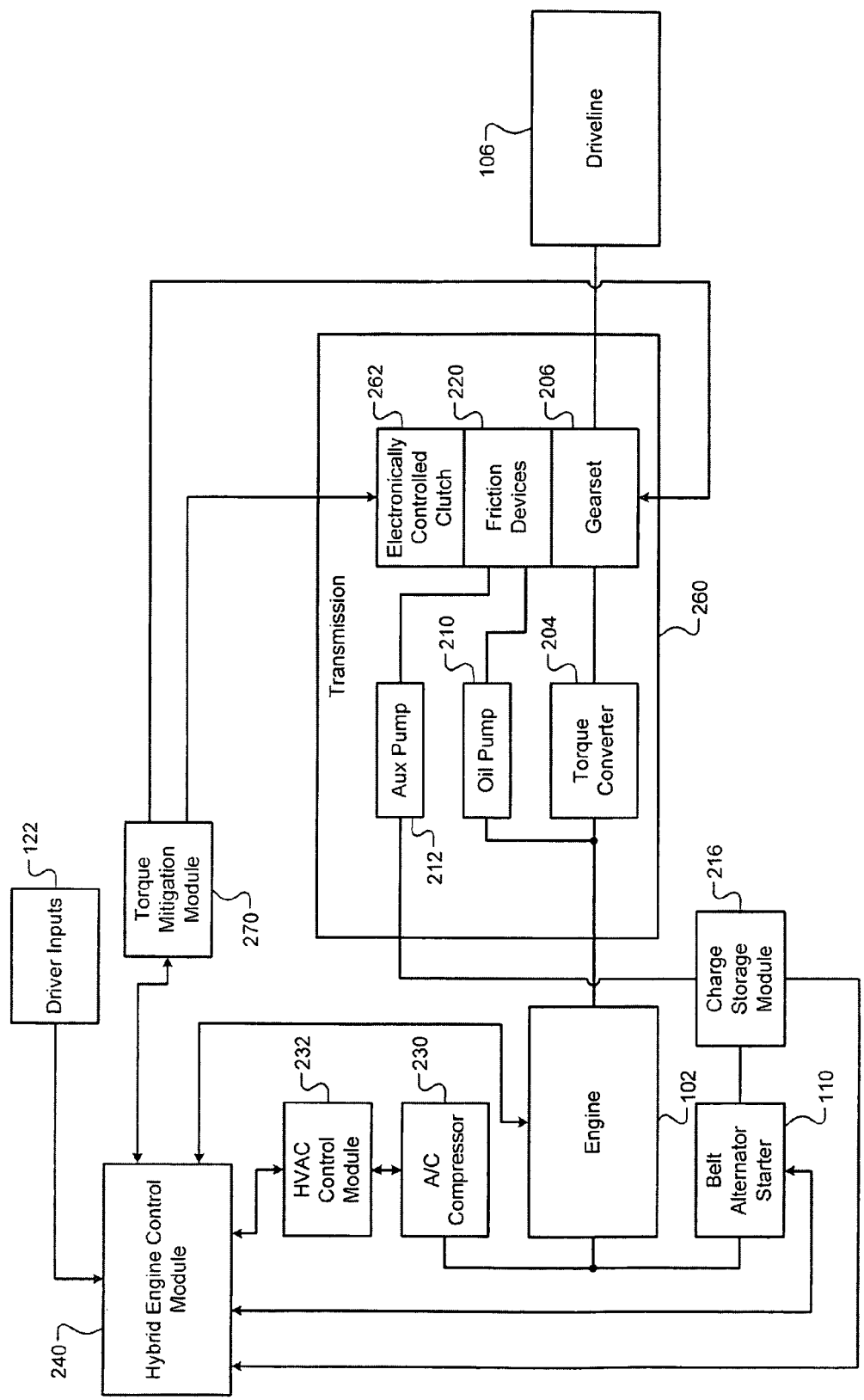
FIG. 2B is a functional block diagram of another exemplary hybrid powertrain according to the principles of the present disclosure.

Referring now to FIG. 2B, a functional block diagram of another exemplary hybrid powertrain is presented. A transmission 260 includes the torque converter 204, the gearset 206, and the friction devices 220. The oil pump 210 and the auxiliary pump 212 provide hydraulic power to the friction devices 220.

An electronically-controlled clutch 262 selectively couples the gearset 206 to the torque converter 204. Alternatively, the electronically-controlled clutch 262 may selectively couple the gearset 206 to the driveline 106. The electronically-controlled clutch 262 is controlled by a torque mitigation module 270.

When the hybrid ECM 240 begins a non-driver-commanded engine restart, the torque mitigation module 270 may deactivate the electronically-controlled clutch 262. This decouples the torque converter 204 from the driveline 106. After a predetermined delay, during which the engine 102 restarts, the torque mitigation module 270 may reengage the electronically-controlled clutch 262. In addition, during this predetermined delay, the torque mitigation module 270 may select a lower gear ratio in the gearset 206.

Figure 3:
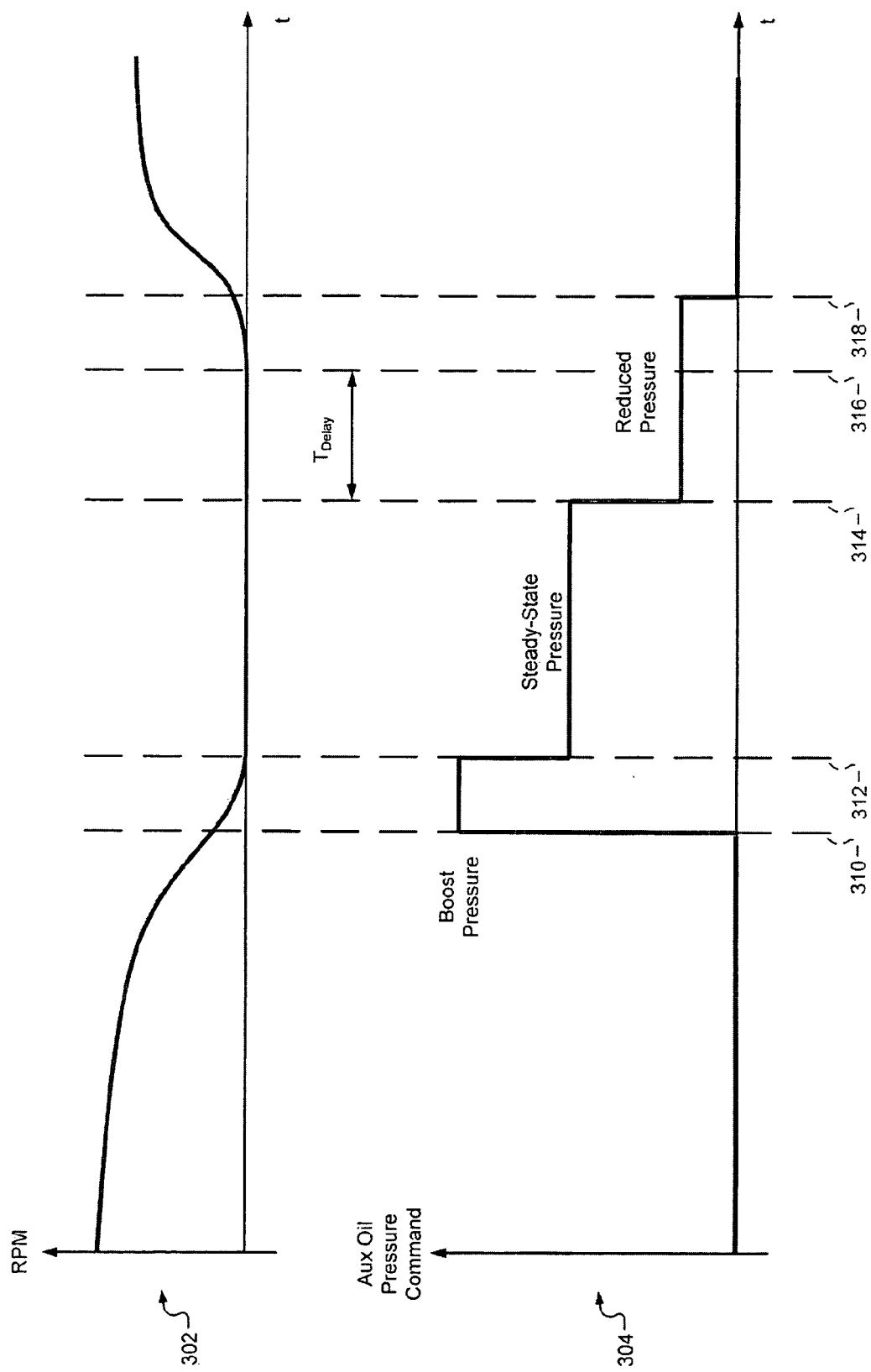
FIG. 3 is a graphical illustration of auxiliary oil pressure commands during a non-driver-commanded engine restart according to the principles of the present disclosure.

Referring now to FIG. 3, a graphical illustration of auxiliary oil pump pressure commands during a non-driver-commanded engine restart is illustrated. Plot 302 depicts engine speed in revolutions per minute (RPM) versus time. Using the same time scale, plot 304 depicts the pressure commanded from the auxiliary pump 212 of FIG. 2A. In plot 302, the engine RPM is first shown decreasing, indicating that the vehicle is coming to a stop.

When vehicle conditions allow, such as zero vehicle speed, brake applied, and zero accelerator pedal position, the hybrid ECM 240 may instruct the engine to shut off (prior to time 310). As the engine RPM decreases past a threshold, such as at time 310, the torque mitigation module 250 may instruct the auxiliary pump 212 to provide a boost pressure. At time 312, after the boost pressure has been applied for a predetermined interval, the torque mitigation module 250 may instruct the auxiliary pump 212 to produce a steady-state pressure, which is lower than the boost pressure.

The steady-state pressure may be maintained for the remainder of the time that the vehicle is stopped. At time 314, the hybrid ECM initiates a non-driver-commanded restart. At approximately this time, the torque mitigation module 250 instructs the auxiliary pump 212 to produce a reduced pressure. The torque mitigation module 250 may also select a reduced gear ratio in the gearset 206.

The value of the reduced pressure may be a function of transmission oil temperature. The reduced pressure may be calibrated so that it matches or is slightly below the pressure required to maintain clutch plates of one of the friction devices 220 in contact. The clutch therefore remains in mesh, but with little ability to transmit torque.

After a predetermined delay, such as one second, the engine is restarted at time 316. The delay allows for the new reduced pressure and/or lower gear to decouple torque-transmitting components of the transmission. The gearset 206 may then be returned to the previously selected gear ratio. Because of the reduced pressure provided to the friction devices 220, the torque produced by the engine restart will not be transmitted to the driveline 106 as a jerk. As the engine 102 increases in speed, the oil pump 210 will take over providing pressure to the friction devices 220. Once the oil pump 210 is producing sufficient pressure, the auxiliary pump 212 may be powered off, as shown at time 318.

Figure 4A:
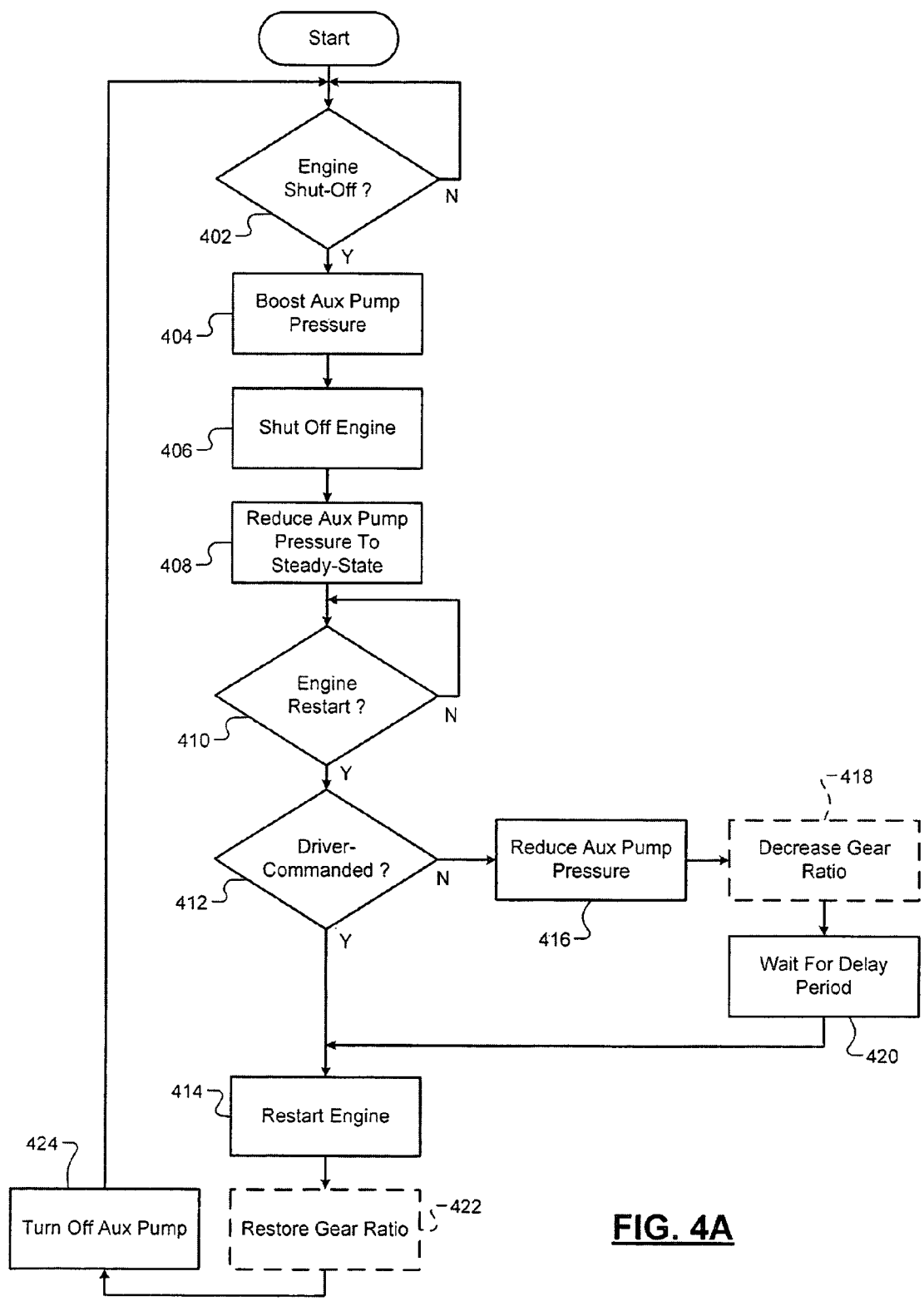
FIG. 4A is a flowchart depicting exemplary steps performed in control of the hybrid powertrain of FIG. 2A according to the principles of the present disclosure.

Referring now to FIG. 4A, a flowchart depicts exemplary steps performed in control of the hybrid powertrain of FIG. 2A. Control begins in step 402, where control determines whether an engine shut-off event has been requested. If so, control transfers to step 404; otherwise, control remains in step 402. An engine shut-off may be initiated when vehicle conditions allow, such as zero vehicle speed, brake applied and zero accelerator pedal position.

In step 404, as the engine RPM drops below a threshold value, the pressure of the auxiliary pump 212 is commanded to a boost pressure level. Control continues in step 406, where the engine is turned off. For example, fuel and spark delivery to the engine may be halted. Control continues in step 408, where pressure of the auxiliary pump 212 is reduced to a steady-state value.

Control continues in step 410, where control determines whether an engine restart is desired. If so, control transfers to step 412; otherwise, control remains in step 410. In step 412, control determines whether the restart was driver-commanded. If so, control transfers to step 414; otherwise, control transfers to step 416. A driver-commanded engine restart may result from the driver releasing the brake pedal or depressing the accelerator pedal.

In step 416, pressure of the auxiliary pump 212 is reduced to a reduced pressure level. The reduced pressure level may be a function of transmission oil temperature, and may be determined from a lookup table indexed by transmission oil temperature. Control continues in optional step 418, where the gear ratio of the gearset 206 is reduced.

Control continues in step 420, where control waits for a predetermined delay period. The predetermined delay period may be a function of internal accumulators in the transmission, oil temperature, clutch pack size, and other factors. Control then continues in step 414. In step 414, the engine is restarted.

Control then continues in optional step 422. In step 422, the gear ratio of the gearset 206 is restored to the previous gear ratio. For example only, the gear ratio may be restored to first gear. Control then continues in step 424, where the auxiliary pump is turned off once the oil pump 210 reaches a sufficient pressure. Control then returns to step 402.

Figure 4B:
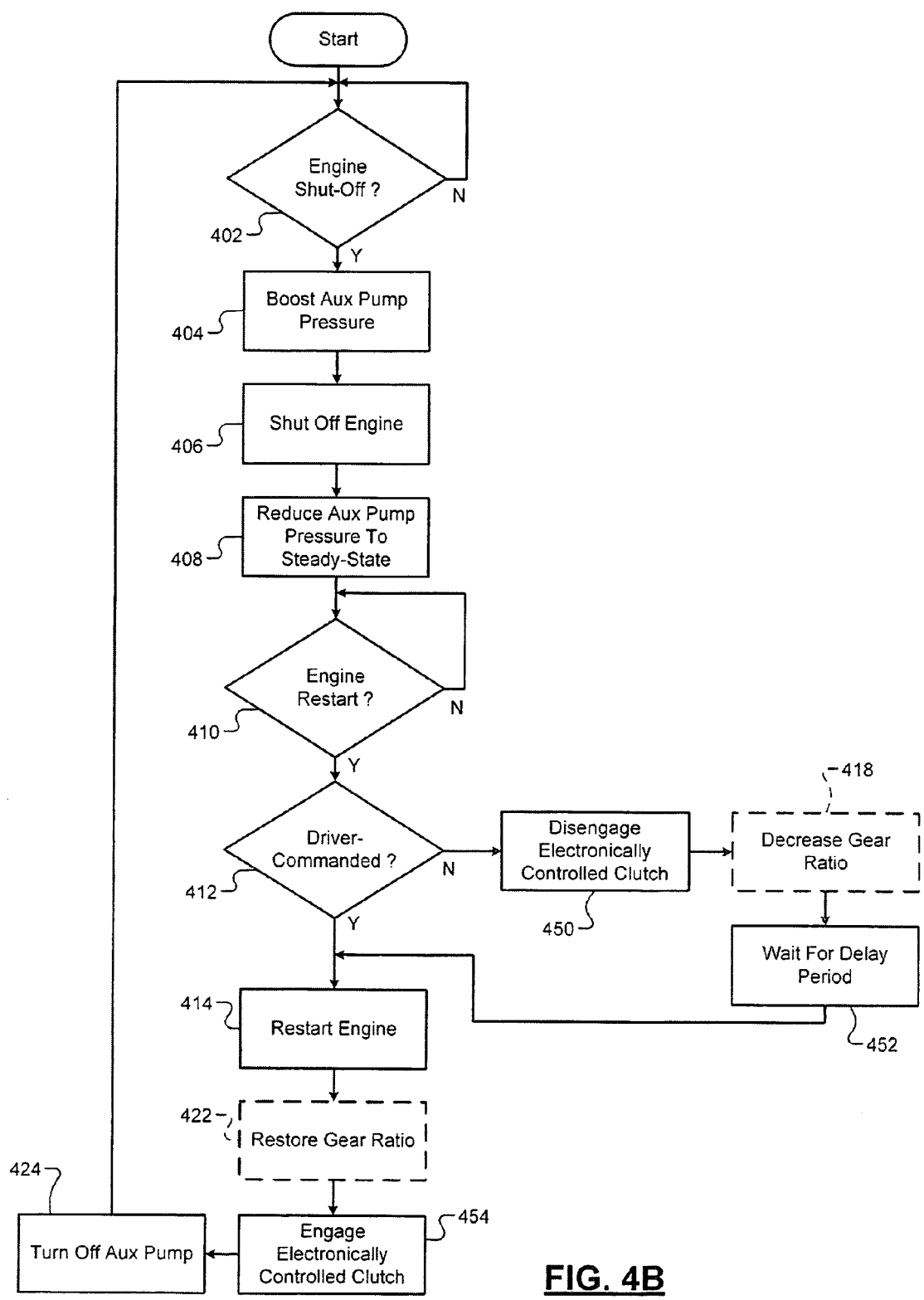
FIG. 4B is a flowchart depicting exemplary steps performed in control of the hybrid powertrain of FIG. 2B according to the principles of the present disclosure.

Referring now to FIG. 4B, a flowchart depicts exemplary steps performed in control of the hybrid powertrain of FIG. 2B. Control may be similar to that of FIG. 4A until step 412. In step 412, control determines whether the engine restart is driver-commanded. If so, control transfers to step 414; otherwise, control transfers to step 450.

In step 450, control disengages the electronically-controlled clutch. In this way, the torque converter 204 is decoupled from the driveline 106. Control transfers to optional step 418, where control may decrease the gear ratio of the gearset 206. Control then continues in step 452, where control waits for a predetermined delay. The predetermined delay period may be determined by the actuation time of the electronically-controlled clutch 262.

Control then continues in step 414, where the engine is restarted. Control then continues in optional step 422, where the original gear ratio of the gearset 206 is restored. Control continues in step 454, where the electronically-controlled clutch 262 is re-engaged. For example only, the electronically-controlled clutch 454 may be reengaged gradually so a sudden increase in torque to the driveline 106 does not result. Control continues in step 424, where control turns off the auxiliary pump 212 once the pressure from the oil pump 210 has reached a sufficient level. Control then returns to step 402.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A hybrid engine control system comprising:
    a hybrid engine control module that selectively stops an internal combustion engine (ICE) and that selectively starts the ICE based upon driver inputs and non-driver inputs; and
    a torque mitigation module that reduces torque transfer from the ICE to a driveline while the ICE is started based upon the non-driver inputs and that maintains torque transfer from the ICE to the driveline while the ICE is started based upon the driver inputs.

2. The hybrid engine control system of claim 1 wherein the torque mitigation module reduces torque transfer by commanding a reduced hydraulic pressure from a pump in a transmission.

3. The hybrid engine control system of claim 2 wherein the reduced hydraulic pressure is a function of transmission oil temperature.

4. The hybrid engine control system of claim 2 wherein the pump is powered by a charge storage module.

5. The hybrid engine control system of claim 1 wherein the torque mitigation module reduces torque transfer by disengaging an electronically-controlled clutch in a transmission.

6. The hybrid engine control system of claim 1 wherein the torque mitigation module reduces torque transfer by selecting a higher gear in a transmission.

7. The hybrid engine control system of claim 1 wherein the non-driver inputs include low state-of-charge of a charge storage module.

8. The hybrid engine control system of claim 1 wherein the non-driver inputs include a demand signal from a heating, ventilation, and air-conditioning module.

9. The hybrid engine control system of claim 1 wherein the driver inputs include signals from an accelerator pedal and a brake pedal.

10. A method comprising:
    selectively stopping an internal combustion engine (ICE);
    selectively starting the ICE based upon driver inputs and non-driver inputs;
    reducing torque transfer from the ICE to driveline while the ICE is started based upon the non-driver inputs; and
    maintaining torque transfer from the ICE to the driveline while the ICE is started based upon the driver inputs.

11. The method of claim 10 wherein the reducing torque transfer includes commanding a reduced hydraulic pressure from a pump in a transmission.

12. The method of claim 11 wherein the reduced hydraulic pressure is a function of transmission oil temperature.

13. The method of claim 10 wherein the reducing torque transfer includes disengaging an electronically-controlled clutch in a transmission.

14. The method of claim 10 wherein the reducing torque transfer includes selecting a higher gear in a transmission.

15. The method of claim 10 wherein the non-driver inputs include low state-of-charge of a charge storage module.

16. The method of claim 10 wherein the non-driver inputs include a demand signal from a heating, ventilation, and air-conditioning module.

17. The method of claim 10 wherein the driver inputs include signals from an accelerator pedal and a brake pedal.

* * * * *

UNITED STATES PATENT AND TRADEMARK OFFICE
CERTIFICATE OF CORRECTION

PATENT NO.        : 9,109,566 B2  
APPLICATION NO.   : 11/954945  
DATED             : August 18, 2015  
INVENTOR(S)       : William L. Aldrich, III It is certified that error appears in the above-identified patent and that said Letters Patent is hereby corrected as shown below:

<u>On the Title Page</u>,

Item [76] should be changed to Item [75]

Item [73] Assignee, insert the following:

--GM Global Technology Operations LLC, Detroit, MI (US)--

Signed and Sealed this
Ninth Day of August, 2016

Michelle K. Lee
*Director of the United States Patent and Trademark Office*